United States Patent Office 3,536,993
Patented Oct. 27, 1970

3,536,993
OPTICAL RESONANCE CELLS
Henri Brun, Paris, France, assignor to CSF-Compagnie Generale de Telegraphie Sans Fil, a corporation of France
Filed Oct. 3, 1968, Ser. No. 764,897
Claims priority, application France, Oct. 18, 1967, 124,925
Int. Cl. G01r *33/08;* H01s
U.S. Cl. 324—.5                3 Claims

ABSTRACT OF THE DISCLOSURE

An optical resonance cell containing the saturating metal vapour which is to be optically pumped and a bulb for the metal, said cell being arranged so as to permit operation at a relatively high temperature. The spacing, L, of the inner surfaces of the cell is chosen to satisfy the relation $N.L.\sigma = \log_e 4$, where N is the atomic density and $\sigma$ is the effective absorption cross section of the atoms of the metal vapour.

---

The present invention relates to the design of optical resonance cells, such as used, for example, in atomic clocks or in optically pumped magnetometers.

The optimal operating temperature of the cells now available is rather low. These cells cannot operate unless the density of the saturating vapour is at an optimum level; if this density is too low, too few atoms are involved in the mechanisms of optical pumping and resonance, and the resonance signal disappears. On the other hand, if the vapour density is too high, there is too much absorption of the pumping light wave, due to the fact that, because of the relaxation phenomenon, the atoms of a vapour are never all orientated in the same way and the output signal reaching the optical detector is too low.

The optimum temperature of operation of a resonance cell is for example 35° C. for caesium vapour and 45° C. for rubidium vapour. Temperature regulation in cells of this kind, when operated in environments with higher temperatures, requires the use of thermoelectric elements (such as frigatorns) which absorb a relatively large amount of power.

One solution has already been put forward with a view to avoiding the need to use such elements. A specific compound of carbon and alkali metal is used so that a suitable alkali vapour pressure is achieved by heating the compound to a temperature in the order of 300° C. or more. However, this approach has the drawback that it is necessary to heat a part of the resonance cell to 300° C. and this may be a problem with regard to the stability of the system, into which the cell is incorporated, due to the development of convection currents in the buffer gas normally employed.

It is an object of the invention to overcome the above mentioned drawbacks and to provide a resonance cell the temperature regulation of which is simple to effect in all conditions of operation normally encountered, without requiring a large power consumption.

According to the invention there is provided an optical resonance device comprising a cell; a bulb communicating with said cell and an alkali metal in said bulb; and means for propagating a beam of pumping light through said cell; said cell having, in the direction of said beam, for a predetermined operation temperature T, an inner thickness L, selected for the product $N.L.\sigma$ to be substantially equal to $\log_e 4$, where N is the atomic density of the vapour of said alkali metal at said temperature T and $\sigma$ is the effective absorption cross-section of said light by the atoms of said vapour at said temperature T, outside the resonance condition.

For a better understanding of the invention and to show how the same may be carried into effect, reference will be made to the drawing accompanying the ensuing description and in which:

FIG. 1 illustrates in a highly schematic manner the optical part of an optical resonance system, such as a magnetometer or atomic clock, employing an optical resonance cell in accordance with the invention.

Figure 1:
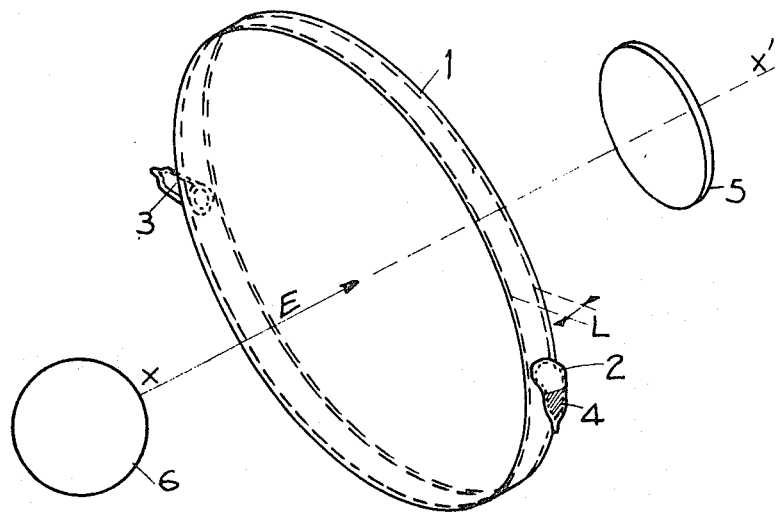
FIG. 1 illustrates a first embodiment of the invention.

A system of this kind is equipped with a resonance cell 1, a light source 6 supplying pumping luminous energy E in the direction XX', and an optical detector 5. In the conventional manner, the cell 1 possesses an exhaust tip 3 and a bent bulb 2 containing the metal 4, which are diametrally opposite one another, the cell containing the saturating vapour of the metal 4 and, possibly, a buffer gas. In accordance with the invention, the dimensions of the cell 1 are such that the vapour thickness L traversed by the pumping light wave enables optimum operation of the cell to take place at a temperature well in excess of the temperatures of operations of known cells, for example at a temperature in the order of 80° C. In accordance with the invention, the determination of the thickness of the cell in the direction of the axis XX', is effected as follows:

Let $I_0$ be the intensity of the light wave at the input to the cell. After having propagated along a distance $x$ through the vapour in the cell, the luminous intensity $I_0$ will have dropped, as a consequence of absorption (due to the relaxation phenomenon) to:

$$I = I_0 e^{-\sigma N x}$$

where $\sigma$ is the effective absorption cross-section presented by the atoms of the saturating vapour to the light wave, and N is the atomic density of the vapour, i.e. the number of atoms per cm.³ The applicant has found that, in order to obtain an optimum signal at the output from the cell as a function of the resonance phenomenon being detected, it is necessary to satisfy the following condition outside resonance:

$$NL\sigma \simeq \log_e 4$$

Thus, the value of L is determined as a function of the absolute temperature T of operation selected, since N and $\sigma$ are functions of T.

The cells according to the invention have a thickness between 10 and 20 times smaller than was so far usual. For example, where the metal 4 is caesium:

$$N = 2.45 \times 10^{27} \times T^{-\frac{3}{2}} \times e^{-\frac{8910}{T}} \text{ in atoms/cm.}^3$$

from which L is derived:

$$L = 10^{-15} \times T^{\frac{3}{2}} \times e^{\frac{8910}{T}} \text{ in cm.}$$

Figure 2:
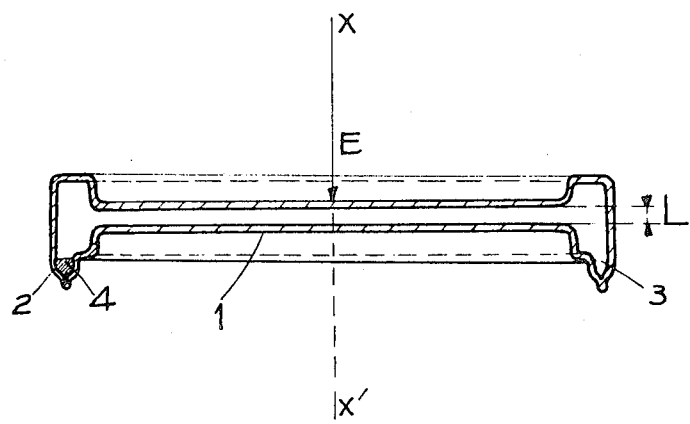
FIG. 2 illustrates a modification.

It will be seen that, by dividing the dimension L normally used, which is in the order of 5 cm. by 10, the temperature of operation of the cell has been raised by 29° C. and thus from 35° C. to 64° C. If it is desired to increase still more the temperature T, it will be possible to decrease correspondingly the dimension L, while maintaining reasonable dimensions to the bulb 2, by using the structure shown in FIG. 2.

The cell illustrated in this figure has a central portion of small thickness L, through which the pumping light wave is propagated, and a peripheral portion of larger size and in which the exhaust tip 3 and the bulb 2 for the alkali metal, both of normal dimensions, are formed.

The optical resonance cells produced in accordance with the present invention present the advantage of having a reduced size and a relatively high operating temperature. This makes the regulation of temperature more simple without any need to use cooling devices which consume power. In the case of operation at higher temperature there is also no need to heat up a specific part of the cell any more than another, as is the case in cells which use a compound of carbon and alkali metal, so that the stability of the systems incorporating the cell of the invention, is improved.

Of course the invention is in no way limited to the embodiments described here which were given solely by way of example.

What is claimed is:

1. An optical resonance device comprising a transparent resonance cell; a bulb communicating with said cell, an alkali metal in said bulb; and means for propagating a beam of pumping light through said cell; said cell having, in the direction of said beam, for a predetermined operation temperature T, a spacing between inner surfaces which provides a vapour thickness L, selected so that the product $N.L. \sigma$ is substantially equal to $\log_e 4$, where N is the atomic density of the vapour of said alkali metal at said temperature T and $\sigma$ is the effective absorption cross-section of said light by the atoms of said vapour at said temperature T, outside the resonance condition.

2. An optical resonance device as claimed in claim 1, wherein said cell has a flat disc shape.

3. An optical resonance device as claimed in claim 1, wherein said cell comprises a flat, disc-shaped central zone having a spacing between inner faces equal to L, the faces of said central zone being perpendicular to said beam, and an annular portion of greater thickness carrying said bulb.

References Cited

UNITED STATES PATENTS 3,242,423   3/1966   Malnar _____ 324—.5

RUDOLPH V. ROLINEC, Primary Examiner

M. J. LYNCH, Assistant Examiner